US012684358B2

(12) United States Patent
Vitiello et al.

(10) Patent No.: US 12,684,358 B2
(45) Date of Patent: Jul. 14, 2026

(54) LAWFUL INTERCEPTION ON NETWORK SLICES

(71) Applicant: Telefonaktiebolaget LM Ericsson (publ), Stockholm (SE)

(72) Inventors: Antonio Vitiello, Pompei (IT); Gino Ciccone, Aprilia (IT); Dario De Vito, Mercato San Severino (IT); Biagio Maione, Naples (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 692 days.

(21) Appl. No.: 18/020,677

(22) PCT Filed: Aug. 13, 2020

(86) PCT No.: PCT/EP2020/072806
§ 371 (c)(1),
(2) Date: Feb. 10, 2023

(87) PCT Pub. No.: WO2022/033694
PCT Pub. Date: Feb. 17, 2022

(65) Prior Publication Data
US 2023/0269591 A1 Aug. 24, 2023

(51) Int. Cl.
*H04M 1/66* (2006.01)
*H04W 12/80* (2021.01)
(52) U.S. Cl.
CPC .................................. *H04W 12/80* (2021.01)
(58) Field of Classification Search
CPC ..... H04W 12/80; H04W 12/02; H04W 12/03; H04L 63/30; H04L 63/306
See application file for complete search history.

(56) References Cited

U.S. PATENT DOCUMENTS

| | | | | |
|---|---|---|---|---|
| 2005/0152275 A1* | 7/2005 | Laurila | ................. | H04L 63/306 |
| | | | | 709/224 |
| 2012/0115479 A1* | 5/2012 | Ehrenholm | ............. | H04W 8/02 |
| | | | | 455/436 |
| 2016/0112261 A1* | 4/2016 | Amato | ................. | H04L 63/306 |
| | | | | 709/220 |
| 2017/0085704 A1* | 3/2017 | Rao | ..................... | H04L 65/1096 |

(Continued)

OTHER PUBLICATIONS

"3rd Generation Partnership Project; Technical Specification Group Services and System Aspects; Security; Lawful Interception (LI) architecture and functions (Release 16)", 3GPP Standard; Technical Specification; 3GPP TS 33.127 (Year: 2020).*

(Continued)

*Primary Examiner* — Shantell L Heiber
(74) *Attorney, Agent, or Firm* — Withrow & Terranova, PLLC

(57) ABSTRACT

Methods and devices provide lawful interception (LI) using slice-based mediation and delivery functions (sMDFs) and providing network slices configured for performing LI functionality as required. A network slice of a radio communication system is selected if configured to execute an sMDF. If a party to a service delivered using a network function (NF) implemented on the selected slice is indicated as being an LI target, then LI data intercepted from the NF is forwarded to the sMDF within the selected slice. The sMDF then reformats and transmits the LI data outside the network slice.

17 Claims, 14 Drawing Sheets

(56)                References Cited

U.S. PATENT DOCUMENTS

2020/0228608 A1    7/2020  Talebi Fard et al.
2021/0051070 A1*   2/2021  Akman .................. H04W 4/50

OTHER PUBLICATIONS

Author Unknown, "An Introduction to Network Slicing," 2017, GSM Association, London, UK, 20 pages.
Author Unknown, "Generic Network Slice Template," Official Document NG.116, Version 2.0, Oct. 16, 2019, GSM Association, 61 pages.
Author Unknown, "Technical Specification Group Services and System Aspects; System architecture for the 5G System (5GS); Stage 2 (Release 16)," Technical Specification 23.501, Version 16.5.0, Jul. 2020, 3GPP Organizational Partners, 441 pages.
Author Unknown, "Technical Specification Group Services and System Aspects; Management and orchestration; Concepts, use cases and requirements (Release 16)," Technical Specification 28.530, Version 16.2.0, Jul. 2020, 3GPP Organizational Partners, 31 pages.
Author Unknown, "Technical Specification Group Services and System Aspects; Management and orchestration; Provisioning; (Release 16)," Technical Specification 28.531, Version 16.3.0, Sep. 2019, 3GPP Organizational Partners, 70 pages.
Author Unknown, "Technical Specification Group Services and System Aspects; Security; Lawful Interception (LI) architecture and functions (Release 16)," Technical Specification 33.127, Version 16.3.0, Mar. 2020, 3GPP Organizational Partners, 88 pages.
Author Unknown, "Technical Specification Group Services and System Aspects; Security; Lawful Interception (LI) architecture and functions (Release 16)," Technical Specification 33.127, Version 16.5.0, Sep. 2020, 3GPP Organizational Partners, 92 pages.
Author Unknown, "Network Functions Virtualisation (NFV); Security; Report on NFV LI Architecture," Group Report NFV-SEC 011, Version 1.1.1, Apr. 2018, ETSI, 49 pages.
Author Unknown, "Lawful Interception (LI); Handover Interface and Service-Specific Details (SSD) for IP delivery; Part 1: Handover specification for IP delivery," Technical Specification 102 232-1, Version 3.21.1, Dec. 2019, ETSI, 74 pages.
Kozlowski, et al., "Open issues in network slicing," 9th International Conference on the Network of the Future, 2018, IEEE, pp. 25-30.
Otd, "s3i70113: Lawful Interception in 5G Networks," 3GPP SA3-LI Meeting, Apr. 25-28, 2017, Palm Beach, Florida, 17 pages.
Invitation to Pay Additional Fees and Partial Search for International Patent Application No. PCT/EP2020/072806, mailed Apr. 30, 2021, 16 pages.
International Search Report and Written Opinion for International Patent Application No. PCT/EP2020/072806, mailed Jun. 7, 2021, 23 pages.
International Preliminary Report on Patentability for International Patent Application No. PCT/EP2020/072806, mailed Oct. 11, 2022, 12 pages.

* cited by examiner

FIGURE 6

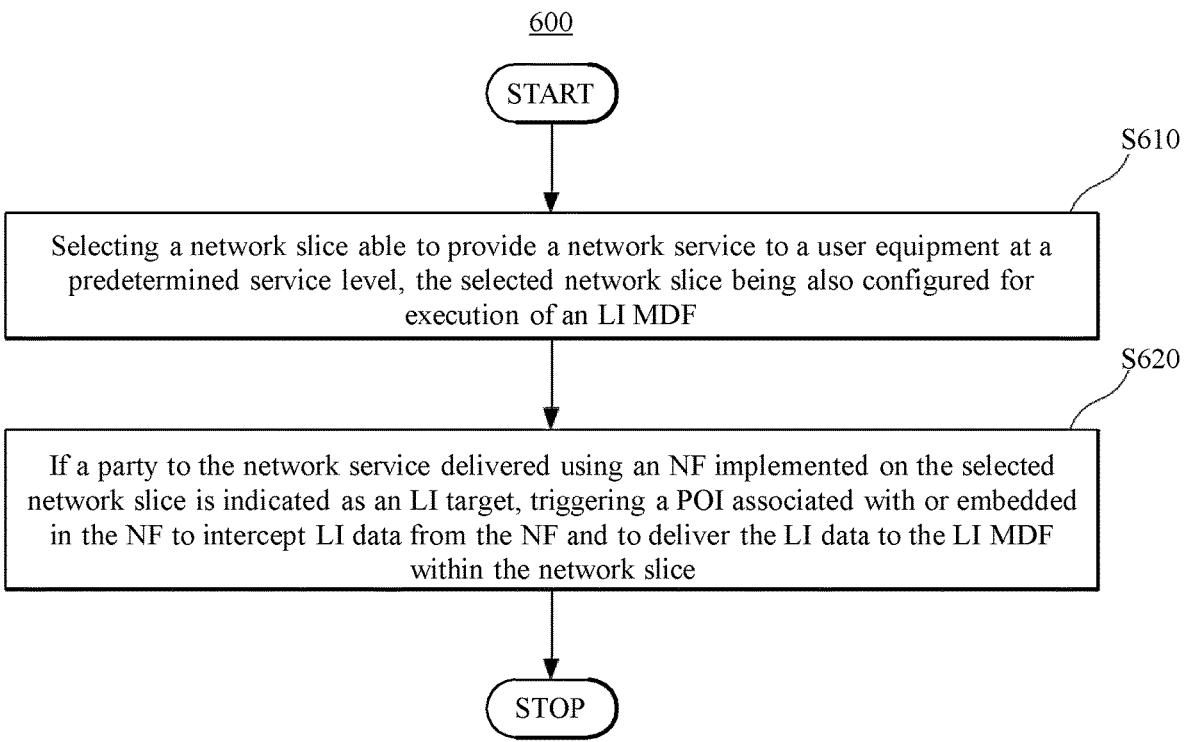

600

START

S610

Selecting a network slice able to provide a network service to a user equipment at a predetermined service level, the selected network slice being also configured for execution of an LI MDF

S620

If a party to the network service delivered using an NF implemented on the selected network slice is indicated as an LI target, triggering a POI associated with or embedded in the NF to intercept LI data from the NF and to deliver the LI data to the LI MDF within the network slice

STOP

700

START

S710

Providing at least two network slices configured to enable delivery of network services and to execute an LI MDF

S720

On each of the network slices, connecting one or more POIs associated with or embedded in one or more NFs, to the LI MDF on the respective network slice on which the one or more NFs is implemented

STOP

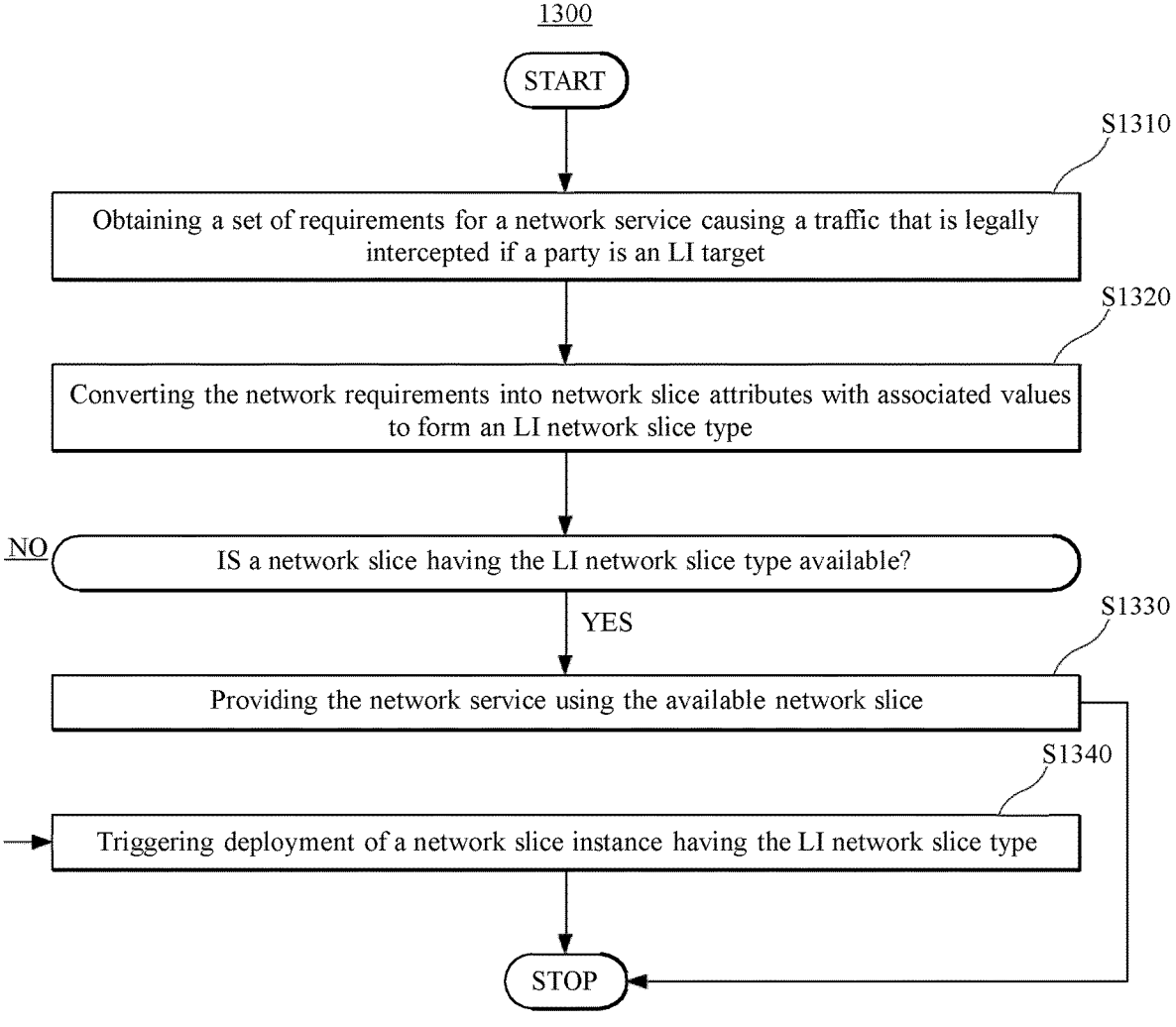

1300

START

S1310

Obtaining a set of requirements for a network service causing a traffic that is legally intercepted if a party is an LI target

S1320

Converting the network requirements into network slice attributes with associated values to form an LI network slice type NO — IS a network slice having the LI network slice type available?

YES

S1330

Providing the network service using the available network slice

S1340

Triggering deployment of a network slice instance having the LI network slice type

STOP

1400

LAWFUL INTERCEPTION ON NETWORK SLICES

This application is a 35 U.S.C. § 371 national phase filing of International Application No. PCT/EP2020/072806, filed Aug. 13, 2020, the disclosure of which is incorporated herein by reference in its entirety.

TECHNICAL FIELD

The invention generally relates to lawful interception (LI) in a radio communication system with network slices.

BACKGROUND

Network slicing is a network architecture approach according to which independent logical networks (known as network slices) are defined on a common physical infrastructure. Each network slice includes an independent end-to-end series of network elements arranged to fulfill a specific set of requirements (e.g., ultra-high-bandwidth communication, real-time traffic, etc.) of a network application/service at a predetermined service quality. A network slice may include a terminal, an access network, a core network, a transport network, etc. that may pertain to multiple network operators. Here, a network operator (also known as wireless service provider, wireless carrier, or cellular company) is a company that owns or controls hardware used in providing network services to end users (network subscribers). A radio communication system is a term representing hardware and software organized in communications subsystems cooperatively interconnected to provide wireless network services.

A network slice includes dedicated and/or shared resources in terms of processing power, storage and bandwidth, and operates separately from other network slices. Network slicing, which is a feature introduced in 5G (i.e., fifth generation technology standard for cellular networks), is a paradigm where resources and topology are optimized in slices to serve a purpose, deliver a service or respond to particular customer demands (i.e., slices created "on demand"). So, network slicing allows the implementation of tailor-made functionality meeting specific requirements.

The network slices are parallel, virtualized and mutually isolated although they may share a common distributed cloud infrastructure. In other words, each network slice (NS) is a separate logical network that provides specific network capabilities and network characteristics and has its own associated resources (e.g., computing, storage and networking resources). The creation of a slice (also called "deployment") can be triggered by a network provider, third parties (tenants), and, in some cases, also by network subscribers.

The network slicing management, which encompasses generating and using a network slice, includes four phases as illustrated in FIG. 1 (which is similar with FIG. 4.3.1.1. of 3GPP TS 28.530 entitled "Aspects; Management and Orchestration; Concepts, use cases and requirements", release 16.2.0 (2020-07)): preparation 110, commissioning 120, operation 130 and decommissioning 140. Preparation 110 includes network slice design, on-boarding, evaluation of the network slice requirements, preparing the network environment and other necessary preparations completed before a network slice instance (NSI) is deployed. Commissioning 120 includes NSI creation/deployment (with allocation of resources and implementation of required functionality) and customization for standard functions. Operation 130 includes activation, supervision, performance monitoring, and capacity planning/modification. Finally, decommissioning 140 includes removal of NSI's resources and functions, and NSI termination.

The information describing NSI (which information is used in the preparation phase) may include resource model information, management model information and capability model information. The resource model information describes static parameters and functional components of the network slice, and includes a service profile, a network slice type (e.g., enhanced mobile broadband, eMBB, ultra reliable low latency communications, URLLC, and massive machine type communications, mMTC), additional system features (e.g., multicast, edge computing), and priority. The management model information describes the information model used for network slice's lifecycle management and includes a configuration profile (e.g., application configuration parameters). The capability model information describes network slice's capabilities including supported communication service characteristic information (e.g., service type, UE mobility level, density of users, traffic density), QoS attributes (e.g., bandwidth, latency, throughput and so on) and capacity (e.g., maximum number of UEs). This information can be exposed to a service recipient via a communication service management function.

The above-discussed network slice information has been codified into a standardized list of attributes made public in Official Document NG. 116 entitled "Generic Network Slice Template," Version 2.0 made public by GSMA in October 2019. As defined in section 2.2. of this document, a generic network slice template (GST) is a set of attributes characterizing a type of network slice. GST is generic (i.e., not tied of any specific network deployment), but a network slice type (NEST) is a GST in which the attributes have associated values determined based on specific requirements inferred from a use case (e.g., a network application/function to be executed using the network slice).

FIG. 2 (which corresponds to FIG. 2 in the Official Document NG. 116) illustrates GST and NEST in context of a network slice lifecycle. A network slice customer (NSC) 210 sets forth requirements 230 for a specific network service use scenario 220. A network slice provider (NSP) then maps the service requirements 230 into attributes of the GST 240 with appropriate values generating NEST 250 at 260. One or more NSIs can be created using the same NEST, but existing NSI(s) may also be reused. Thus, network slice instances (often called simpler "network slice") are prepared by a network slice provider (NSP) according to a NEST prepared to meet requirements for a use case specified by a network slice customer (NSC).

Network operators have legal obligations to allow lawful interception. Lawful interception, LI, is a process performed parallel with a network application if a network user (subscriber), which is a party in the application, is an LI target. The LI process selectively forwards information (such as, interception-related information, IRI, and communication content, CC) intercepted from the network application to a law enforcement agency, LEA, with legal authorization (evidenced by a warrant that specifies the LI target) to acquire such information. A public official (e.g., a judge) may authorize a network user's investigation, thereby allowing lawful interception of his communications. The authorization paper known as a "warrant", which is provided to the LEA, is converted in digital form identifying an LI target (i.e., the investigated network user) and the extent of interception (e.g., the type of information intercepted).

Network slicing makes implementation of LI more challenging than in conventional networks due to network slices' separation (i.e., isolation and independence from one another). Each network slice may need its own mechanism (interfaces, functions and encryption) for LI of data or voice related to a network application, according to the LI requirements. Such a mechanism adds an undesirable complexity (draining resources or creating bottlenecks) to the overall network slicing architecture and has been so far an unresolved issue.

For example, FIG. 3 illustrates a conventional LI in a radio communication system with network slices. Radio communication system 300 provides network services at different service levels to subscribers 301-304 via network functions (NFs) 322, 324, 326, 332, 334, 336, 342, 344, 346 executed on network slices 320, 330 or 340. The service level agreements of the users and the specific service's requirements determine the service level (i.e., priority, type or traffic, etc.) at which the service is delivered. Thus, network slices have to be able to ensure that the network services are provided at predetermined service levels. Here, the attribute "predetermined" indicates that the service level is set and known for a deployed (i.e., existing) network slice.

Points of interceptions (POIs) 322p, 324p, 326p, 332p, 334p, 336p, 342p, 344p and 346p attached or embedded in the NFs are connected to mediation and delivery function (MDF) 350 located outside the slices via interfaces 322i, 324i, 326i, 332i, 334i, 336i, 342i, 344i and 346i, respectively. If a party to the network service provided using an NF on a network slice is indicated as being an LI target, the POI intercepts LI data (i.e., at least IRI and sometimes also CC if thus specified in the warrant) from the NF and forwards the LI data to MDF 350. MDF 350 then reformats and delivers the LI data to a law enforcement monitoring function, LEMF, run on a device pertaining to LEA. The multiple interfaces emerging from a slice are a security risk, and difficult to handle by a single function (MDF 350), particularly, when LI data is encrypted and reflects different types of traffic for the different applications (network functions) performed on the network slices.

LEA device 362 indicates LEA targets to LI administration function 308 that includes an LI control function, LICF, and an LI provision function, LIPF. LICF maintains a centralized LI target list. The LIPF indicates LI targets to the NF as soon as they are deployed. Some functions (e.g., AMF 312, NSSF 314 and NRF 316) illustrated in FIG. 3, which are common to all slices and usable by different users, are not described in detail here in order to maintain focus on the relevant aspects, but their description can be found, for example, in 3GPP TS 33.127 entitled "System Architecture for the 5G System," version 16.5.0 (2020-07).

Network slicing is a technical area still under development as typical carrier-grade requirements as interoperability, scalability, controllable performance, security, accounting, etc. are not yet coherently and satisfactory solved. Developing tools and approaches that would ease implementing LI for network applications and services provided using network slices remains the subject of ongoing interest.

SUMMARY

The approach that inspired the various embodiments ease implementation of LI in systems with network slices. An object of the invention is to enable use of slice-based LI mediation and delivery functions, thereby improving LI data delivery from one or more network functions (applications) running on a network slice to LEA. Another object of the invention enables deployment of network slices configured to execute a slice-based LI MDF, respectively.

According to an embodiment, there is a method for providing LI in a radio communication system with network slices. The method includes selecting one of the network slices able to provide a network service at a predetermined service level to a user equipment. Here the selected network slice is also configured to execute an LI MDF. The method further includes triggering a point of interception associated with or embedded in a network function implemented on the selected network slice to intercept LI data from the NF, and to forward the LI data to the LI MDF within the selected network slice, if a party to the network service has been indicated as being an LI target. The LI MDF reformats and transmits the LI data outside the selected network slice.

According to another embodiment there is a method of providing LI capability in a radio communication system. The method includes providing at least two network slices configured to enable delivery of network services, each of the at least two network slices being also configured to execute an LI MDF. The method further includes, on each of the at least two the network slices, connecting one or more points of interceptions associated with or embedded in one or more network functions to the LI MDF. The one or more POIs are configured to intercept LI data from at least one of the one or more NFs, respectively, and to forward the LI data to the LI MDF inside a respective one of the at least two network slices, and the LI MDF is configured to reformat and transmit the LI data outside the respective one of the at least two network slices.

According to yet another embodiment, there is a radio communication system including network slices and a network device configured to select one of the network slices able to provide a network service to a user equipment at a predetermined service level using a network function. Here, the selected network slice is also configured to execute an LI MDF. The network device is further configured to trigger a POI associated with or embedded in the network function to intercept and to forward the LI data to the LI MDF within the selected network slice, if an indication that a party to the network service is an LI target has been received. The LI MDF then reformatting and transmitting the LI data outside the selected network slice.

According to another embodiment, there is a network device in a radio communication system with network slices. The network device has a network interface and a data processing unit adapted to select one of the network slices able to provide a network service to a user equipment, the selected network slice being also configured to execute an LI MDF. The network interface and the data processing unit are further adapted to trigger a POI to intercept LI data from an NF implemented on the network slice for delivering the network service and to forward the LI data to the LI MDF within the one of the network slices, if an indication that a party to the network service is an LI target has been received.

According to another embodiment, there is a network device in a radio communication system with network slices. The network device has a network slice selection module configured to select one of the network slices able to provide a network service to a user equipment at a predetermined service level using an NF, the selected network slice being also configured to execute an LI MDF.

According to another embodiment, there is a computer-readable storage medium containing executable codes that cause a processor to perform a method for providing LI in a radio communication system with network slices. The method includes selecting one of the network slices able to provide a network service at a predetermined service level to a user equipment. Here the selected network slice is also configured to execute an LI MDF. The method further includes triggering a point of interception associated with or embedded in a network function implemented on the selected network slice to intercept LI data from the NF, and to forward the LI data to the LI MDF within the selected network slice, if a party to the network service has been indicated as being an LI target. The LI MDF reformats and transmits the LI data outside the selected network slice. According to another embodiment, there is computer program comprising instructions which, when executed by a network device in a radio communication system with network slices, cause the network device to carry out this method.

According to another embodiment, there is a method for providing a network slice with lawful interception with LI capabilities. The method includes obtaining a set of requirements for a network service causing a traffic that is legally intercepted if a party is an LI target. The method further includes converting the network requirements into network slice attributes with associated values to form a LI network slice type. The method then includes, if a network slice having the LI network slice type is available, providing the available network slice to be used for the network service, otherwise (i.e., no network slice having the LI network slice type is available), triggering deployment of a network slice instance having the LI network slice type.

According to another embodiment, there is a network device in a radio communication system with network slices. The network device has a network interface and a data processing unit adapted to obtain a set of requirements for a network service causing a traffic that is legally intercepted if a party is an LI target, and to convert the network requirements into network slice attributes with associated values to form a LI network slice type. The network device is further adapted, if a network slice having the LI network slice type is available, to provide the network service using the available network slice, and, otherwise, to trigger deployment of a network slice instance having the LI network slice type.

According to yet another embodiment, there is a network device in a radio communication system with network slices. The network device includes: a use-case acquiring module configured to obtain a set of requirements for a network service having traffic that is legally intercepted if a party is an LI target; an LI network slice type generator configured converting the network requirements into network slice attributes with associated values that form a LI network slice type; and an LI network slice supplier configured to provide the network service if a network slice with the network slice type is available, and to trigger deployment a network slice instance having the LI network slice type otherwise.

According to another embodiment there is a computer-readable storage medium containing executable codes that cause a processor to perform a method for providing a network slice with LI capabilities. The method includes obtaining a set of requirements for a network service causing a traffic that is legally intercepted if a party is an LI target. The method further includes converting the network requirements into network slice attributes with associated values to form a LI network slice type. The method then includes, if a network slice having the LI network slice type is available, providing the available network slice to be used for the network service, otherwise (i.e., no network slice having the LI network slice type is available), triggering deployment of a network slice instance having the LI network slice type. According to yet another embodiment, there is a computer program comprising instructions which, when executed by a network device in a radio communication system with network slices, cause the network device to carry out this method.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 is a flowchart of a method of providing LI in a radio communication system with deployed network slices, according to another embodiment;

FIG. 10 illustrates a virtualized LI reference architecture;

FIG. 12 illustrates GST-LI and NEST-LI in the context of a network slice lifecycle;

FIG. 13 is a flowchart of a method for providing a network slice with LI capabilities according to an embodiment;

DETAILED DESCRIPTION

Figure 1:
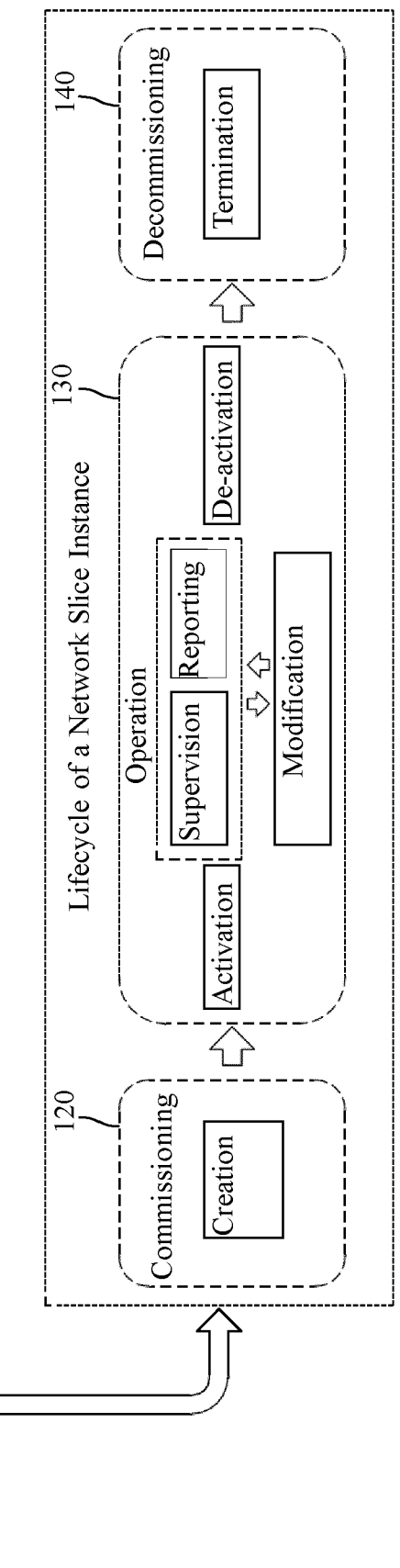
FIG. 1 illustrates management aspects of network slicing.
Figure 2:
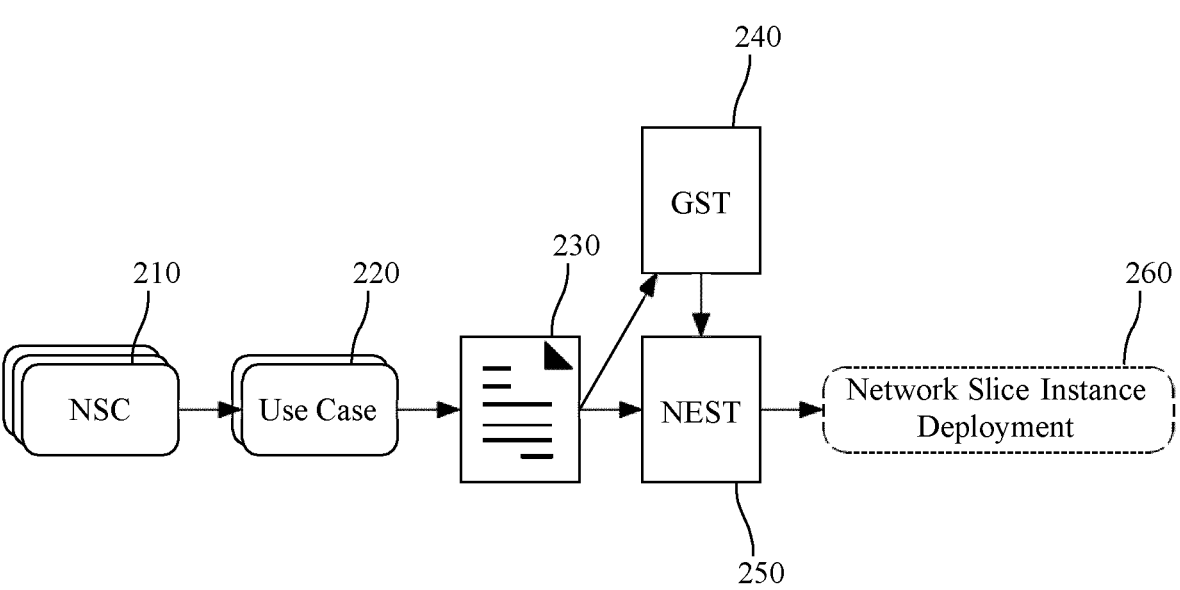
FIG. 2 illustrates GST and NEST in context of a network slice lifecycle.

The meanings of some abbreviations used in this document are explained below:

ADMF Administration Function
AMF Access and Mobility Management Function
CC Communication Content
eMBB Enhanced Mobile BroadBand
GPSI Generic Public Subscription Identifier
GSM "Groupe Speciale Mobile" (orig. French)
GSMA GSM Association
GST Generic Network Slice Template
IMEI International Mobile Equipment Identity
IMSI International Mobile Subscriber Identity
IP Internet Protocol
IRI Intercept Related Information
KPI Key Performance Indicator
LEA Law Enforcement Agency
LEMF Law Enforcement Monitoring Function
LI Lawful Interception
LICF Lawful Interception Control Function
LIPF Lawful Interception Provisioning Function
LRPG Lawful Interception Routing Proxy Gateway MAC Media Access Control MANO Management and Orchestration MDF Mediation and Delivery Function mMTC massive Machine Type Communications MSISDN Mobile Subscriber Integrated Services Digital Network Number NEST Network Slice Type NF Network Function NFV Network Functions Virtualization NS Network Slice NSC Network Slice Customer NSI Network Slice Instance NSP Network Slice Provider PEI Permanent Equipment Identifier QoS Quality of Service SIRF System Information Retrieval Function SUPI Subscription Permanent Identifier NRF Network Repository Function NSSF Network Slice Selection Function ORCH Orchestrator OSS/BSS Operations Support System/Business Support System POI Point Of Interception UE User Equipment VIM Virtual Infrastructure Manager VNF Virtual Network Function VNFM Virtual Network Functions Manager VNFCI Virtual Network Function Components VNFM Virtual Network Functions Manager URLLC Ultra Reliable Low Latency Communications.

The following description of the embodiments refers to the accompanying drawings. The same reference numbers in different drawings identify the same or similar elements. The following detailed description does not limit the invention. Instead, the scope of the invention is defined by the appended claims. Some of the embodiments are described in a 5G context, but such a context is not to be considered a limitation for the described approaches to LI implementation in radio communication systems supporting network slices.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Implementing LI functionality for application that employ functions on network slices is challenging. The embodiments described in this section focus first on improving LI implementation in this situation, and then on generating network slices able to support such LI implementations.

Figure 4:
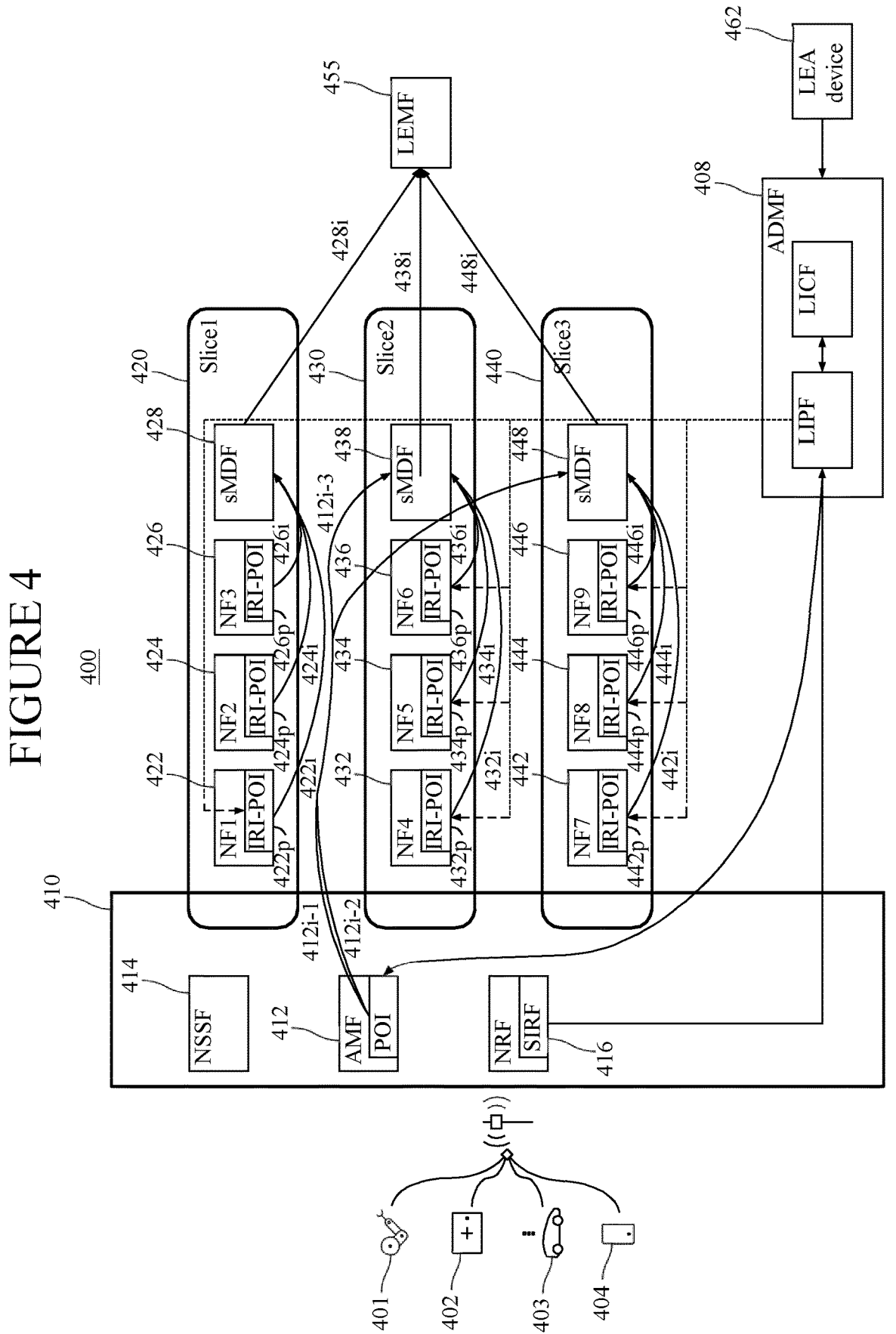
FIG. 4 illustrates an LI implementation in a radio communication system with network slices according to an embodiment.

FIG. 4 illustrates a radio communication system 400 with network slices 420, 430 440 configured to execute slice-based MDFs 428, 438 and 448, respectively. If a network slice is designed to provide a type of network service in which a party may be subject to LI, the network slice may be configured to also execute an LI MDF. Although all the network slices in FIG. 4 are configured to execute LI MDFs, it is not required all network slices in a radio communication system to have this feature.

In 5G system, the LI target may be identified by one or more of the following: 5G Subscription Permanent Identifier (SUR), Permanent Equipment Identifier (PEI) and Generic Public Subscription Identifier (GPSI). Each of these codes or a combination thereof univocally identifies the network user. In particular, the SUPI contains the International Mobile Subscriber Identity (IMSI) or a network access identifier (NAI). The PEI contains the International Mobile Equipment Identity (IMEI) or a MAC address. The GPSI contains the MSISDN or an external identifier. 5G user identities are defined in the 3GPP TS 23.501 entitled "System Architecture for the 5G System" version 16.5.0 (2020-07)."

Similar with system 300, radio communication system 400 provides network services at predetermined service levels to subscribers 401-404. Network functions (NFs) 422, 424, 426, 432, 434, 436, 442, 444, 446 on network slices 420, 430, 440 are employed to provide the services at predetermined service levels. Note that the network services and/or the service levels may be different for different slices.

Figure 3:
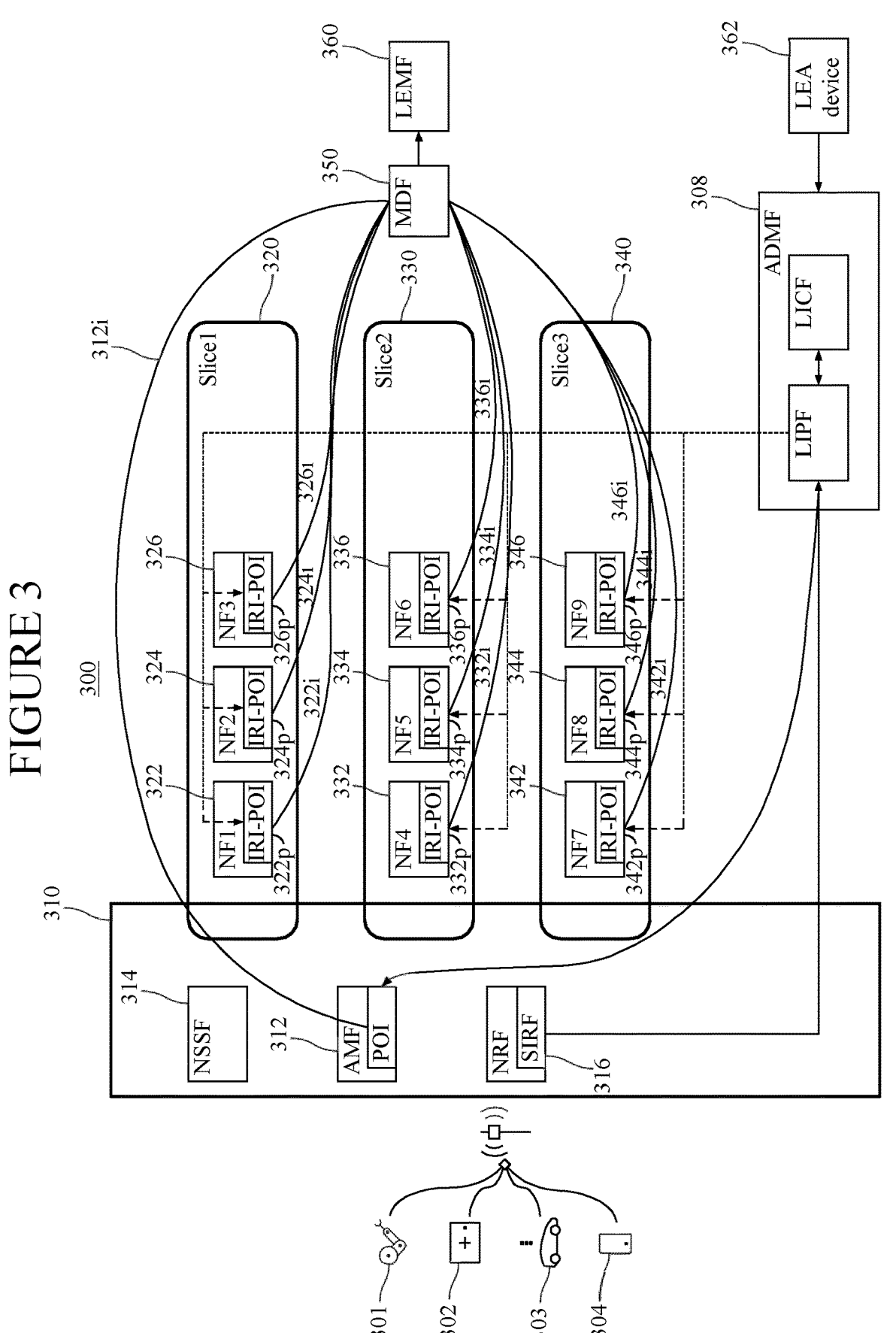
FIG. 3 illustrates a virtualized LI reference architecture.

Different from system 300, network slices of system 400 are configured to execute slice-based MDFs 428, 438 and 448. NFs 422, 424, 426, 432, 434, 436, 442, 444, 446 having attached or embedded POIs 422p, 424p, 426p, 432p, 434p, 436p, 442p, 444p, 446p, are connected to the sMDF (428, 438 or 448) on their network slice (420, 430 or 440) via interfaces 422i, 424i, 426i, 432i, 434i, 436i, 442i, 444i, 446i, respectively. Note that the POIs being labeled "IRI-POI" in FIGS. 3-5 indicates that IRI is acquired but does not exclude CC being intercepted too. Interfaces 428i, 438i and 448i connect sMDFs 428, 438 and 448 to a monitoring function LEMF 455 (executed by a device pertaining to LEA). An access and mobility function 412 (AMF) may be the source of AMF LI data (e.g., intercept-related information relevant to an intercepted service) transmitted to sMDFs 428, 438 and/or 448, via interfaces 412i-1, 412i-2 and 412i-3, respectively.

Figure 5:
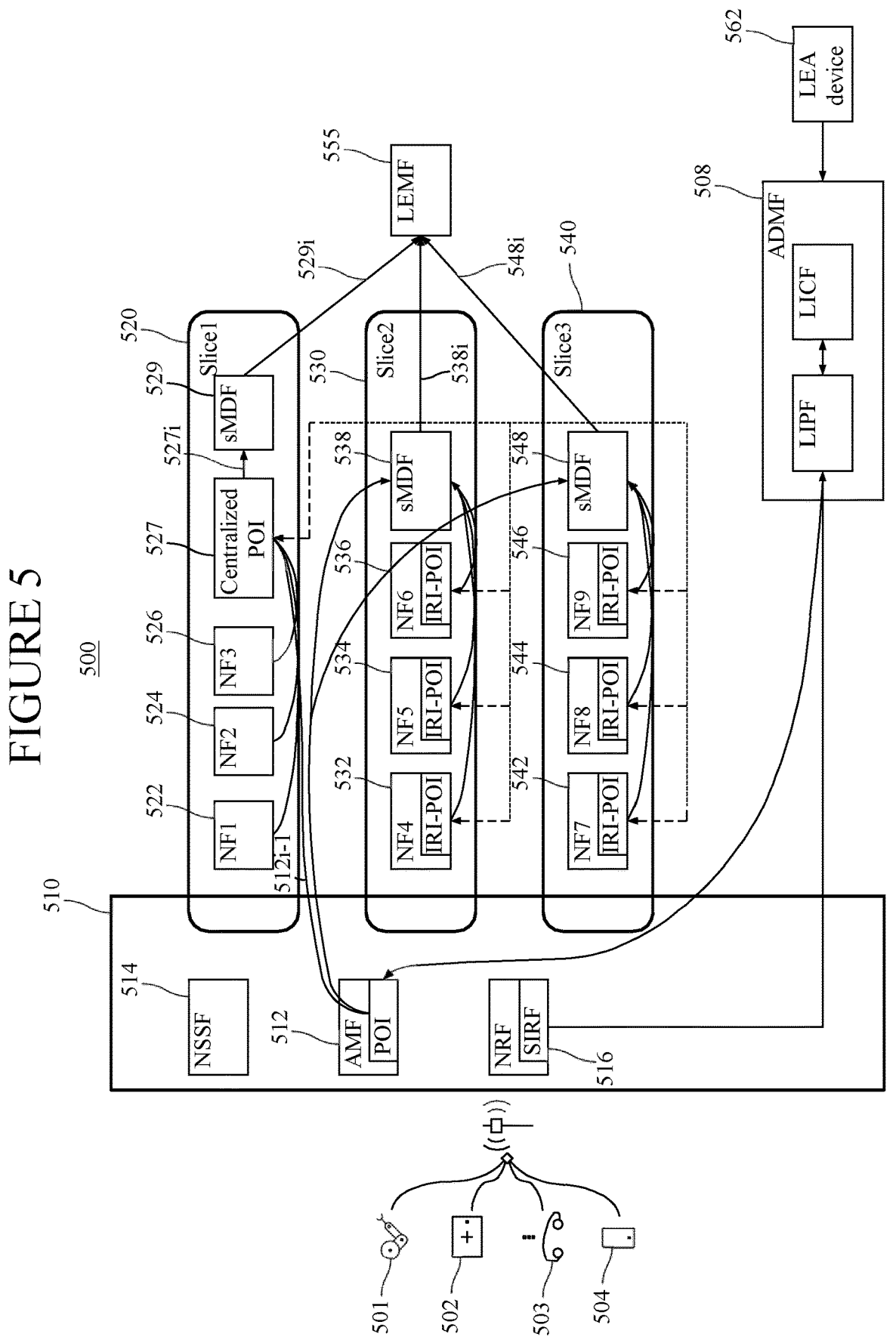
FIG. 5 illustrates an LI implementation in a radio communication system with network slices according to another embodiment.

Similar with system 400, radio communication system 500 illustrated in FIG. 5 has network slices 520, 530 and 540 configured to execute slice-based MDFs 529, 538 and 548, respectively. System 500 is configured to provide network services subscribers 501-504 according at predetermined service levels, using network functions 522, 524, 526, 532, 534, 536, 542, 544, 546 on network slices 520, 530 or 540, respectively.

Different from system 400, on slice 520 of system 500, a centralized POI 527 gathers LI data from NFs 522, 524, 526 and forwards the gathered LI data to sMDF 529 via an interface 527i within network slice. The use of a centralized POI may save resources, but this improvement has to be balanced with the diminished flexibility. Another difference between system 400 and system 500 is that interface 512i-1 intermediates transmission of AMF LI data from AMF 512 to centralized POI 527 not directly to MDF 529. Yet, as in system 400, interfaces 512i-2 and 512i-3 intermediate transmission of AMF LI data from AMF 512 to MDF 538 and 548, respectively.

Networks system 400 and 500 may be 5G systems.

FIG. 6 is a flow diagram of a method 600 for providing LI in a radio communication system with network slices (such as system 400 or 500) according to an embodiment. Method 600 includes selecting one of the network slices (e.g., 420, 430, 440, 520, 530 or 540) able to provide a network service to a user equipment (e.g., any of 401-404, 501-504) at a predetermined service level at S610. The selected network slice has also to be configured to host an LI MDF (e.g., sMDF 428, 438, 448, 529, 538, 548).

Method 600 further includes, at 620, triggering a POI (e.g., 422p, 424p, 426p, 432p, etc.) associated with or embedded in an NF (that is, 422, 424, 426, 432, etc.) implemented on the selected network slice for delivering the network service, to intercept LI data from the respective NF and to forward the LI data to the LI MDF within the selected network slice, if a party to the network service has been indicated as being an LI target. The LI MDF then reformats and transmits the LI data outside the network slice (e.g., to the LEMF 455 or 555 executed by a LEA device).

In one embodiment, if the selected slice provides a second network service to the party, using a second NF implemented therein, then a second point of interception associated with or embedded in the second NF is triggered to intercept the LI data from the second NF and to forward this LI data to the LI MDF within the selected network slice.

Furthermore, in one embodiment, if the selected network slice delivers the network service using another NF, and another party involved in this other network service has been indicated as being another LI target, then another point of interception associated with or embedded in the other NF is triggered to intercept the LI data from the other NF and to forward this intercepted LI data to the LI MDF within the selected network slice.

The POI may encrypt the LI data forwarded to the LI MDF. Alternatively or additionally, the LI MDF encrypts the LI data transmitted outside the network slice.

In S610, whether a network slice is configured to execute the LI MDF may be determined based on a value of an LI MDF support attribute of a network slice type corresponding to the network slice as discussed in more detail later in this document.

In one embodiment, the method may further include triggering a point of interception (e.g., 412*p*, 512*p*) associated with or embedded in an access and mobility management function (e.g., 412, 512) of the network system, to intercept AMF LI data and to transmit the AMF LI data to the LI MDF that reformats and transmits the AMF LI data outside the one of the network slices.

Figure 7:
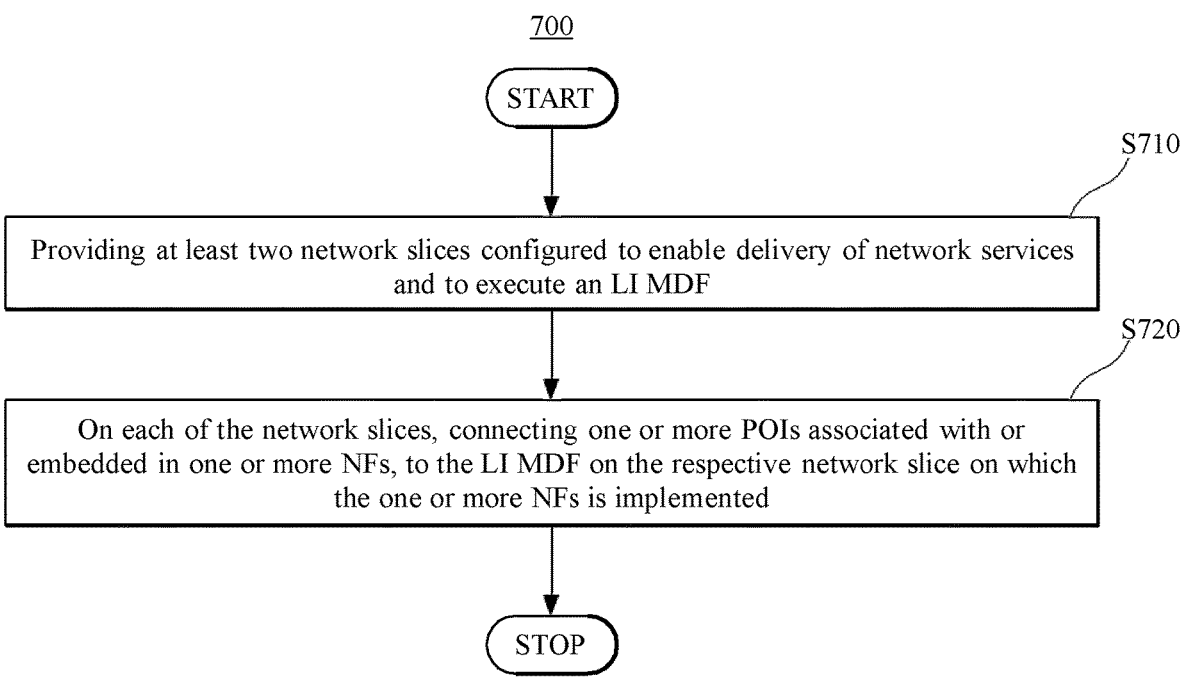
FIG. 7 is a flowchart of a method of providing LI capability in a radio communication system, according to another embodiment.

FIG. 7 is a flowchart of a method 700 of providing LI capability in a radio communication system according to another embodiment. Method 700 includes providing at least two network slices (e.g., any two of 420, 430 and 440 or 520, 530 and 540) operating at different service levels and configured each for executing an LI MDF (e.g., 428, 438, 448, 529, 538 and 548) at S710.

Method 700 then includes, at S720, on each of the at least two network slices connecting one or more POIs (422*p*, 424*p*, 426*p*, 432*p*, etc.) associated with or embedded in NFs implemented therein, to the LI MDF. Interfaces (e.g., 422*i*, 424*p*, 426*p*, 432*p*, etc.) between the POIs and LI MDF are also on the same network slice as the NFs and the LI MDF. The POIs are configured to intercept LI data from the NFs, respectively, and forward LI data to the LI MDF on the same network slice. The LI MDF is configured to reformat and transmit the LI data outside the network slice (i.e., to a LEA device executing the LEMF).

Method 700 may further include connecting a POI (e.g., 412*p*, 512*p*) associated with or embedded in an AMF (e.g., 412 or 512) to the LI MDF on each of the network slices (e.g., via separate interfaces 412*i*_1, 412*i*_2, 412*i*_3, 512*i*_1, 512*i*_2, 512*i*_3). When an NF provides a service and a party to the service is subject to LI, the POI associated with or embedded in the AMF intercepts and delivers AMF LI data to the LI MDF on the same network slice as the NF.

The at least two network slices may be configured to deliver the same network service at different predetermined service levels. Alternatively, the at least two network slices may be configured to deliver different types of network services thereby causing different types of traffic.

Figure 8:
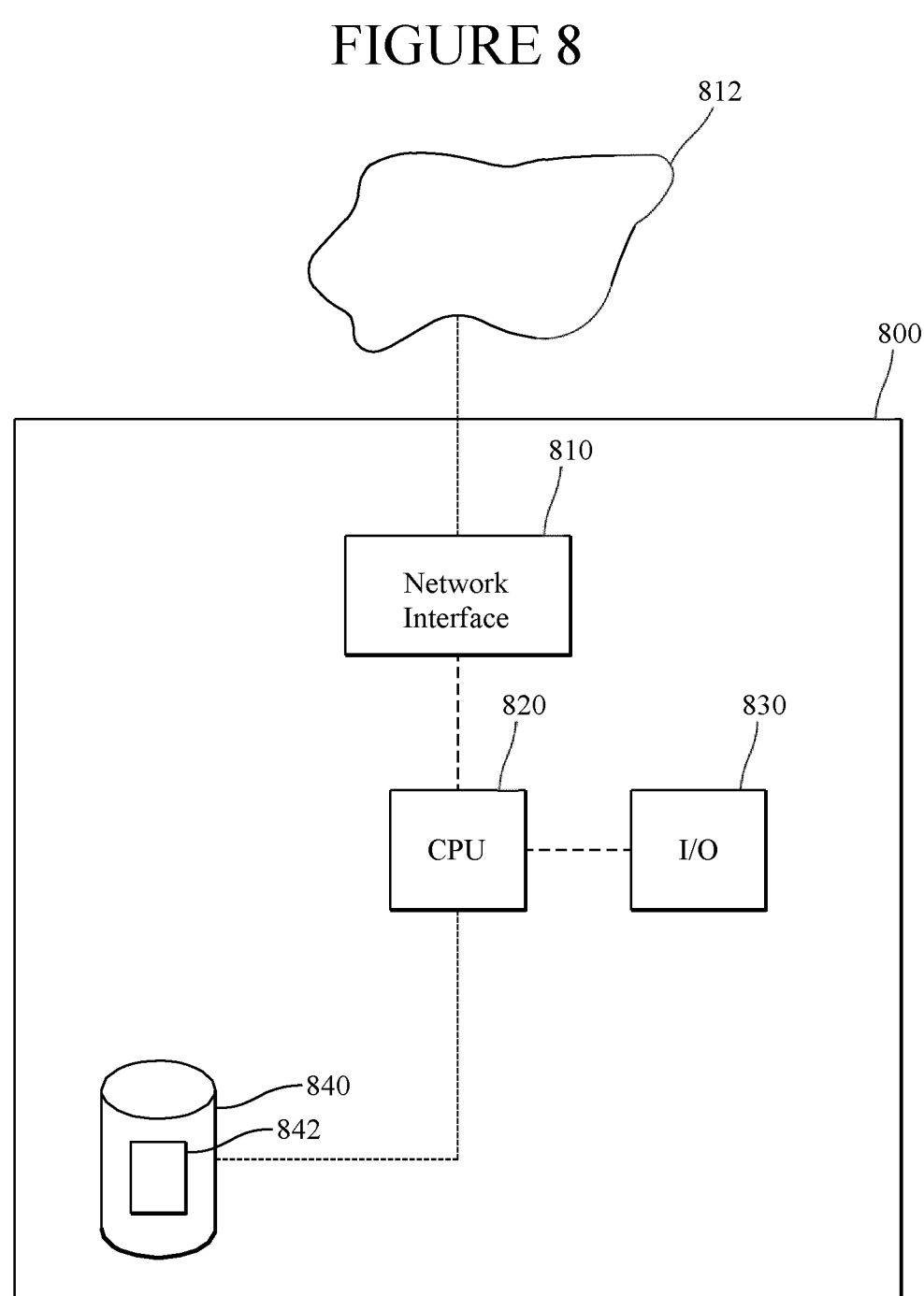
FIG. 8 is a block diagram of a network device according to an embodiment.

The above described methods may be performed by a network device 800 as illustrated in FIG. 8. Device 800 includes a communication interface 810 and a data processing unit 820. The communication interface is configured to receive and transmit LI-related messages (e.g., receive the warrant and transmit reformatted LI data) via network 812. Device 800 may also include a memory 840 and an operator interface 830. Memory 840 may store executable codes or a computer program 842, which, when executed by the data processing unit 820 make it perform any of the above-described methods.

Figure 9:
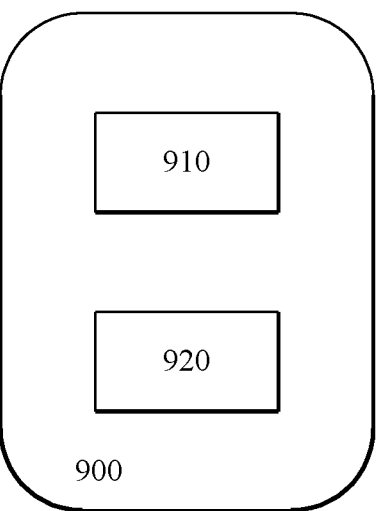
FIG. 9 is another diagram of network device according to an embodiment.

FIG. 9 is a diagram of a network device 900 able to perform method 600 and its variants. Network device 900 includes a network slice selection module 910 and an LI trigger module 920.

Network selection module 910 is configured to select one of the network slices (e.g., 420, 430, 440, 520, 530 or 540) able to provide a network service to a user equipment (e.g., 401-404, 501-504) at a predetermined service level, using an NF (e.g., any of 422, 424, 426, 432, etc.). The selected network slice has to be also configured to execute an LI MDF (e.g., 428, 438, 448, 529, 538, 548).

LI trigger module 920 is configured to trigger a POI (such as 422*p*, 424*p*, 527, etc.) associated with or embedded in the NF to intercept and to forward the LI data to the LI MDF within the selected network slice, if an indication that a party to the network service is an LI target has been received. The LI MDF then reformats and transmits the LI data outside the one of the network slices.

The above-described methods and network devices using slice-based MDF provide the advantage of having fewer interfaces (a single one per network slice) for outputting LI data intercepted from NFs run on slices, simplified LI implementation when network slices are used, and, if encryption is used, in-slice encryption handing.

Figure 10:
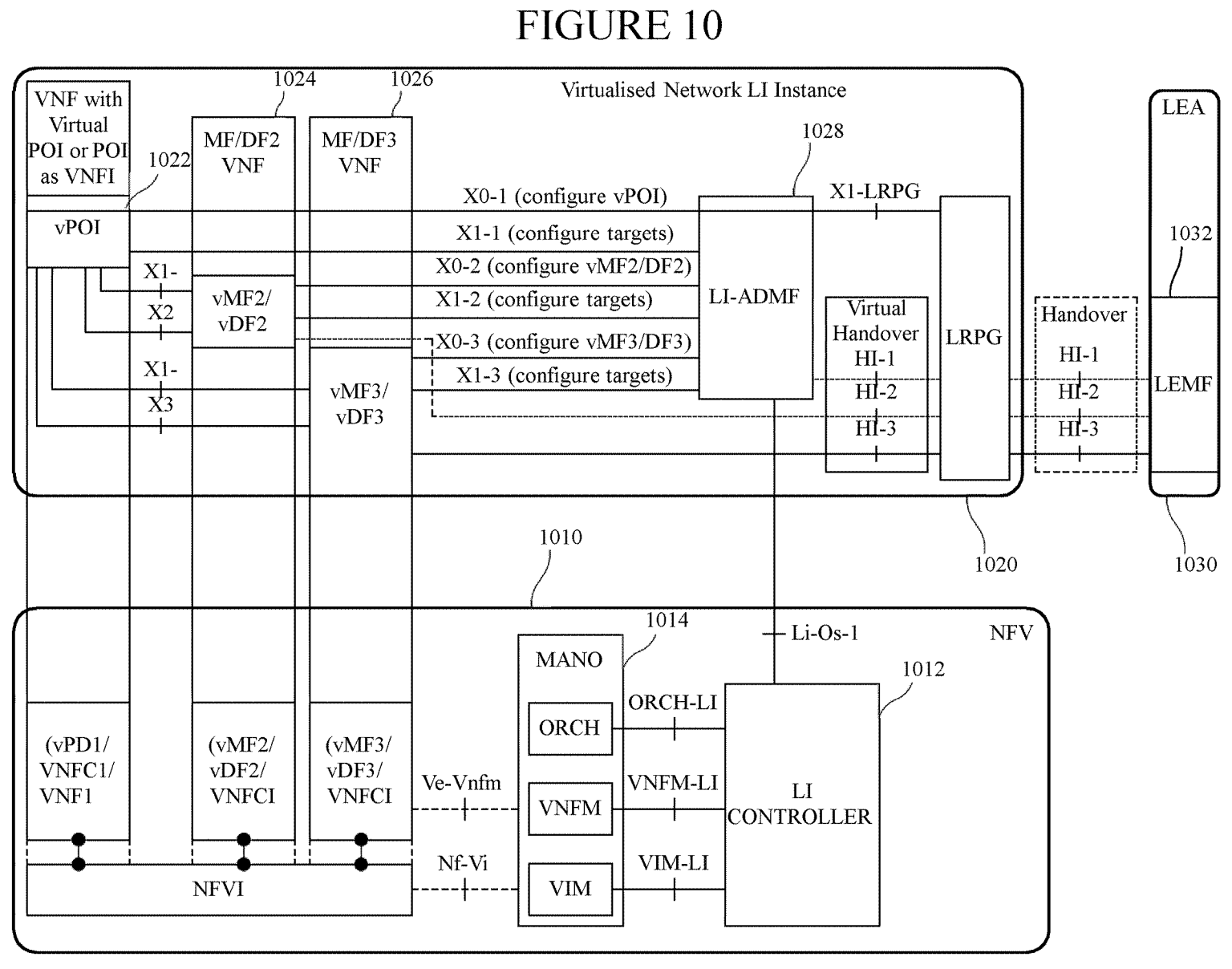

Implementing an LI functionality in the context of virtualization and cloud operation is described in the reference document ETSI GR NFV-SEC 011 entitled "Network Functions Virtualisation (NFV); Security; Report on NFV LI Architecture" of April 2018. FIG. 10 (which corresponds to FIG. 5.3-1 in this reference document) illustrates a virtualized LI reference architecture with a network function virtualization (NFV) module 1010 generating a virtualized network instance 1020 (i.e., 3GPP-like functions in virtualized network service domain) able to deliver LI data to LEA device 1030 (i.e., to a law enforcement monitoring function, LEMF, 1032, via handover interfaces HI-1, HI-2 and HI-3). LI controller 1012, which is responsible for overall configuration and audit of the LI functionality, has NFV-level interactions with management and orchestration (MANO) 1014 for instantiating LI functions: virtual point of interception (vPOI) 1022 and virtual mediation and delivery functions 1024 and 1026 (vMDFs) that have strict security access/visibility requirements. LI administration function 1028 (LI-ADMF) configures the vPOI and vMDFs and communicates the LI target(s).

Figure 11:
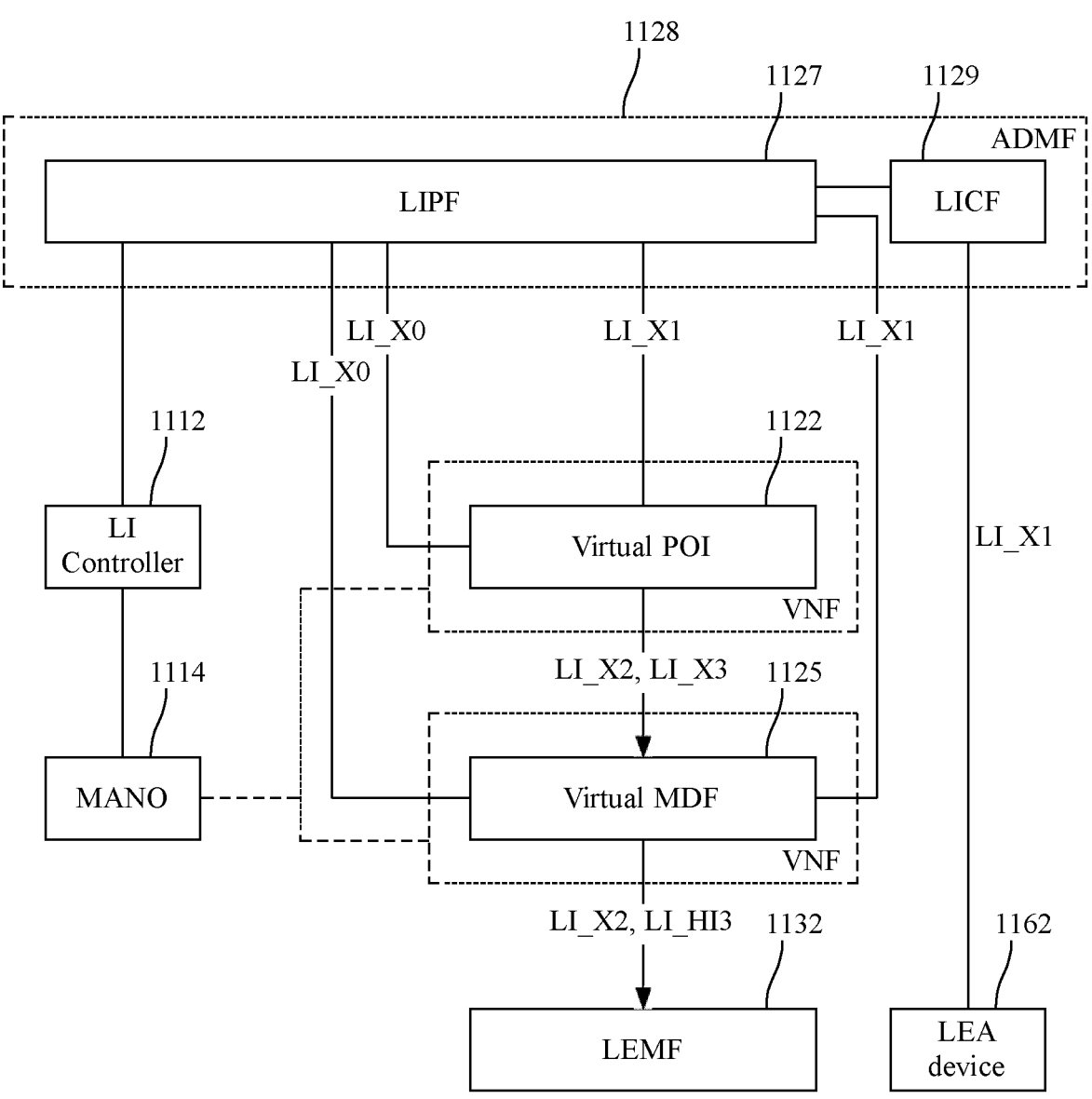
FIG. 11 represents a basic logical architecture of LI function in 5G networks.

A basic logical architecture of LI function in 5G networks is illustrated in FIG. 11. The procedures for NFs deployment assume that LIPF 1127, LICF 1129 and LI controller 1112 already exist. The OSS/BSS (not shown) notifies MANO 1114 when a virtual NF (VNF) needs to be instantiated. To ensure that all LI related aspects are considered, MANO 1114 notifies LI NFV controller 1112 about the VNF instantiation. In case the VNF about to be instantiated is expected to have LI specific functionalities such as POI and MDF, the LI controller notifies LIPF 1127 about LI specific function-alities within the VNF. LIPF 1127 forwards that notification to LICF 1129, which in turn, validates/verifies/authorizes POI and/or MDF for LI and orders LIPF for POI configuration that is performed over LI_X0. Even if the VNF does not need LI functionality, the LI controller may still notify the LIPF/LICF. Once, this validation/verification/authorization/configuration is completed, LIPF 1127 notifies LI controller 1112 that the LI specific functions are authorized/verified, and then LI Controller 1112 notifies MANO 1114.

The following embodiments introduce a GST-LI with LI-related attributes characterizing a network slice. Currently, there is no known procedure for network slice deployment from LI point of view (LI aspects are not covered and by any GST described in the cited documents). The following embodiments provide for automatically supplying network slices ready from LI point of view, and dedicated GST-LI and NEST-LI securely stored and separately handled.

Since GST is a contract between the NSP and the NSC (which may be network operators or specialized companies), the GST-LI and/or NEST-LI can be validated before slice deployment by regulatory entities (agencies, governments, etc). LI regulatory validation may occur before network slice deployment, which is described in the Official Document NG. 116 "Generic Network Slice Template" already mentioned in this document. In this context, using network virtualization and network slicing yields a flexible allocation of LI functionalities in network slices, depending on service type, and a flexible resources allocation for MDFs in network slices (network capabilities are used when needed and where needed). The LI resources being allocated when the network slice is deployed decreases the network operation cost.

A GST-LI includes attributes usable to characterize LI functions and nodes needed in a type of network slice for efficiently implementing LI for NF run on the slice. An LI Network Slice Type (NEST-LI) is a GST-LI in which attributes have assigned values to fulfil a given set of requirements (including LI-related requirements) derived from a network slice customer use case. The NEST-LI is used to generate an NSI by an NSP. Similar with any NEST, the NEST-LI (that includes values of mandatory attributes other than the ones related to the LI-requirements) may be used by as a reference by vendors, operators, providers, customers and also legal agencies that can thus determine whether a network slice fulfills an intended set of requirements (including LI-related ones). An NSC may indicate values or ranges for at least some of the GST-LI's attributes (both LI and non-LI related attributes) depending on the intended use of the network slice (i.e., the use case). The NEST-LI template helps the network operators to select the appropriate network slice among existing (deployed) network slices or to cause a network slice instance to be created as needed.

Figure 12:
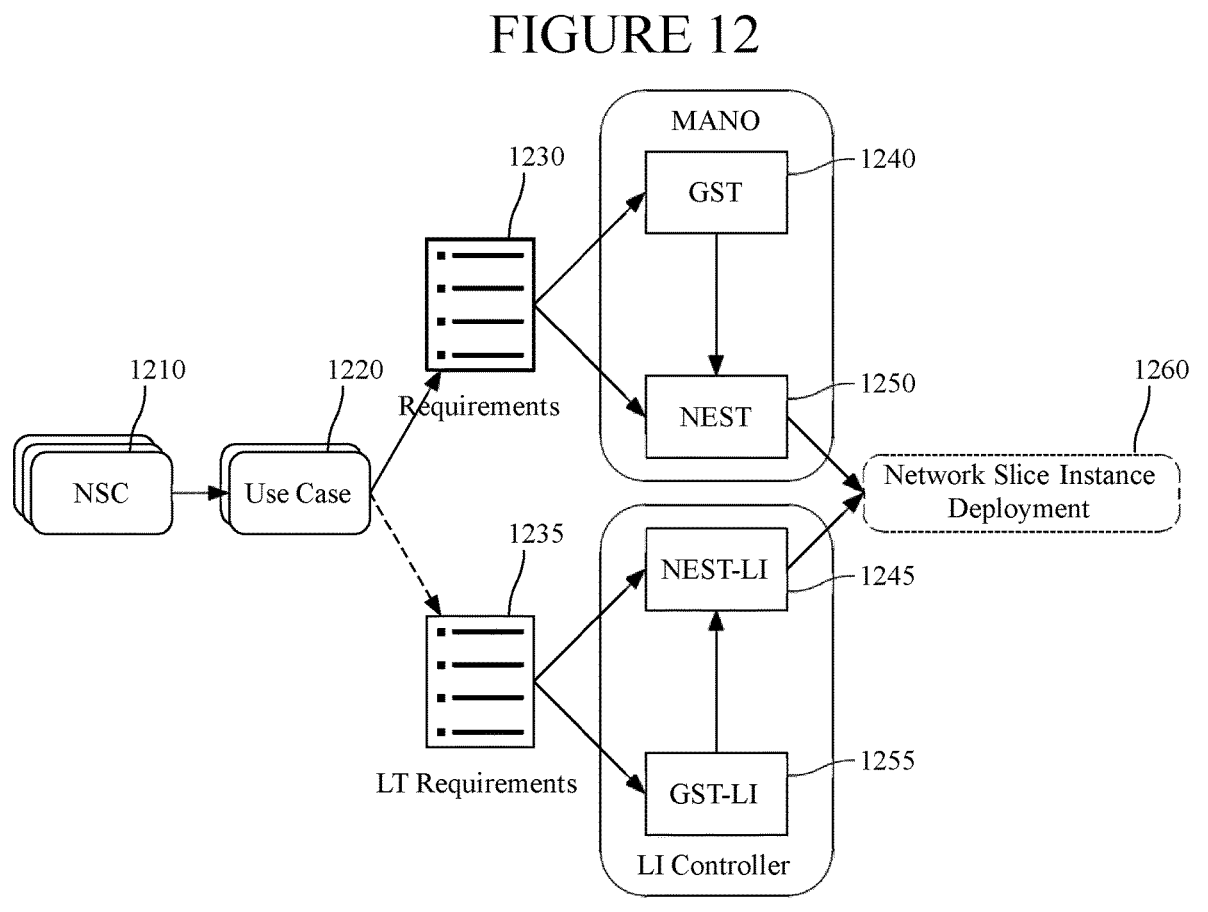

FIG. 12 illustrates GST-LI and NEST-LI in the context of a network slice lifecycle. First, NSC 1210 sets forth network service requirements 1230 and LI requirements 1235 for use case 1220. NSP (not shown) maps these service requirements into the attributes of both GST 1240 and GST-LI 1245 with the appropriate values then generating NEST 1250 corresponding to the GST if no LI is appropriate and NEST-LI 1255 corresponding to the GST-LI is LI usage is possible. Templates NEST 1250 or NEST-LI 1255 are then used to deploy an NSI fulfilling all requirements for use case 1220, at 1260.

GST-LI and NEST-LI contain sensitive information from security point of view and therefore they are preferably stored separately from GST and NEST. In FIG. 12, GST and NEST information is stored in MANO, while GST-LI and NEST-LI are stored in the LI controller. The LI controller performs a security controller role and the interfaces between LI controller and MANO sharing the basis protocols ORCH-LI/VNFM-LI/VIM-LI (see the interfaces in FIG. 10). Note that the LI NFV functions and interfaces have more stringent security separation, visibility and access requirements than other NFs. In spite of the same basic architecture elements, network slices having NEST-LI type achieve distinct, extended capabilities.

Similar with the non-LI GST (described, for example, in 3GPP TS 28.530 entitled "Aspects; Management and orchestration; Concepts, use cases and requirements", v16.2.0 (2020-07) and 3GPP TS 28.531 entitled "Management and Orchestration; Provisioning" version 16.3.0 (2019-09)), GST-LI have attributes, categories and tagging and convey resource information, management information and capability information. GST-LI attributed have a defined presence being mandatory if attribute's value must be present, conditional if attribute's value is present in certain conditions are met or optional if attribute's value does not have be present.

The attributes may be character attributes or scalability attributes. Character attributes characterize a slice from LI perspective (e.g. throughput, latency, Application Program Interfaces (APIs), etc.) and are independent of the NSC and the NSP. Scalability attributes provide information about scalability of the network slice (e.g., number of terminals) and are specific for the NSC and the NSP. Different use cases and network slice design may yield some attributes being a character or a scalability attribute (e.g., area of service), but never both.

Character attributes can be tagged. The tags attached to the attributes provide additional information about the attribute. More than one tag may be attached to a character attribute.

Performance-related tags specify key performance indicators (KPIs) supported by the network slice (e.g., throughput and latencies) from LI perspective.

Function-related tags specify functionality provided by the network slice (e.g., provisioning function, mediation function, etc.).

Control and management-related tags specify methods provided to the NSC for controlling and managing the slice. The performance-related tags and the function-related tags play a role before the slice is deployed, while the control and management-related tags are relevant after the slice is deployed.

Exposure attributes characterize NSC to slice interaction. For example, API indicates that NSC may use an application program interface to get access to slice's capabilities.

Descriptions of some LI-related attributes usable in various GST-LIs embodiments now follow. Attribute "MDF Support" describes whether the network slice is configured to enable a slice-based MDF. This attribute is a binary parameter, for example, having value "0" if MDF is not supported, and "1" if MDF is supported. In order to present the attributes in a manner consistent with definition of other attributes in the standardized list of attributes, for each attribute is specified whether its value is associated with a measurement unit. Attribute "MDF Support" is not associated with any measurement unit and it is an optional character attribute. As previously discussed, a NEST-LI having this optional attribute set to 1 is stored in the LI controller. The "MDF Support" parameter enables the NSC to comply with LI requirements before slice deployment by providing for an in-slice MDF being created thereby the network slice exposing a single interface for outputting LI data gathered from slice network function(s).

Attribute "LI Area of service" specifies where LI is enabled. The value is a string or series of strings, for example, names of one or more countries (e.g., Italy, France, Japan, UK). This attribute is not associated with any measurement unit either and it is also an optional character attribute.

A performance-related attribute is "IRI maximum delivery latency time" that specifies a maximum time interval between IRI interception and delivery to LI-MDF in the slice. The value of this attribute is a float point number (e.g., 300.0) representing the maximum time interval in milliseconds (i.e., ms is the measurement unit). This attribute is also a character attribute (operation scalability attribute KPI) and its presence is optional.

Another performance-related attribute is "Call Content delivery samples availability" that indicates whether loss of intercepted CC within the slice is tolerated. This is also a character attribute with optional presence. "Call Content delivery samples availability" attribute is a binary parameter (e.g., value "0" indicating that loss is tolerated and "1" that loss is not tolerated), not associated with any measurement unit.

Yet another performance-related attribute is "IRI maximum expected throughput" that specifies the maximum throughput expected for IRI. This attribute's value is an integer number (e.g., 300), the associated measurement unit being IRI/sec. In this context, IRI is a complete set of information about a single traffic event, a kind of "information unit". IRI maximum expected throughput" is a character attribute (operation scalability attribute KPI) and its presence is optional.

Similarly, "Call Content maximum expected throughput" is another performance-related attribute that specifies the maximum throughput expected for CC. Its value is an integer number (e.g., 10) and associated measurement unit is GByte/sec. This attribute is also a character attribute (operation scalability attribute KPI) and its presence is optional.

Without elaborating, other function-related attributes may indicate positioning support, service-based interception support, outband roamers support, X3/HI3 interface support, maximum sustainable throughput for warrant activating LI in the slice.

In view of the above-described GST-LI, NEST-LI and additional LI-related attributes, FIG. 13 is a flowchart of a method 1300 for providing a network slice with LI capabilities. Method 1300 (which may be executed by a single network device) includes obtaining a set of requirements for a network service having traffic that is legally intercepted if a party is an LI target, at S1310. The method further includes converting the network requirements into network slice attributes with associated values to form a LI network slice type, at S1320. Here, at least one of the network slice attributes is an LI-related attribute. Any combination of the LI-related attributes may be included in this LI network slice type.

Then, if a network slice having the LI network slice type is available, providing the network service using the available network slice at S1330, otherwise, triggering deployment of a network slice instance having the LI network slice type at S1340.

In one embodiment, method 1300 may be executed by a network device with a structure similar with the one illustrated in FIG. 8. That is, the device's interface (e.g., 810) is configured to obtain a set of requirements for a network service having traffic that may be legally intercepted if a party is an LI target. The device's data processing unit (e.g., 820) is configured to converting the network requirements into network slice attributes with associated values to form a LI network slice type, at least one of the network slice attributes being, an LI-related attribute. Device's data processing unit is also configured to provide information regarding a network slice having the LI network slice type to a network slice customer if such a network slice is available, and, if not available, to deploy a network slice instance having the LI network slice type.

Figure 14:
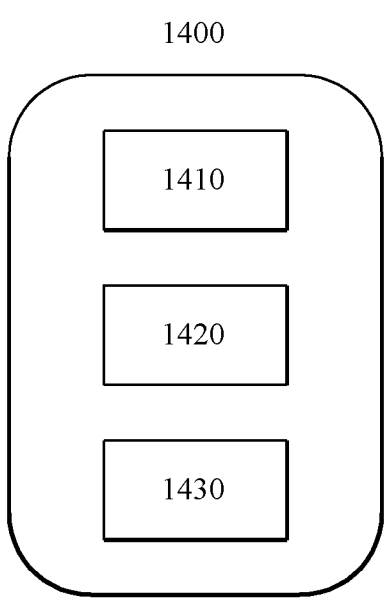
FIG. 14 is a schematic illustration of a network device configured to provide a network slice with LI capabilities according to an embodiment.

In another embodiment, a network device 1400 illustrated in FIG. 14 is configured to provide a network slice with LI capabilities. Network device 1400 includes a use-case acquiring module 1410 configured to obtain a set of requirements for a network service having traffic that is legally intercepted if a party is an LI target. Network device 1400 also includes an LI network slice type generator 1420 configured converting the network requirements into network slice attributes with associated values that form a LI network slice type. Last, but not least, network device 1400 includes an LI network slice supplier 1430 configured to provide information to a network slice customer if a network slice with the network slice type is available, and otherwise to deploy a network slice instance having the LI network slice type.

The embodiments described in this section and variants thereof with LI MDF on a network slice and generating network slices configured to meet LI requirements improve LI implementation in radio communication networks, allowing regulatory validation to occur before network deployment, flexible and automated allocation of LI functionalities in network slices and of LI resources, and a tailor-made implementation of functionality in network slices according to specific needs instead of the conventional one-size-fits-all approach. These features yield operation and capital expenditures savings.

The disclosed embodiments provide methods and network devices providing network slices ready for lawful interception in radio communication networks. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 15:
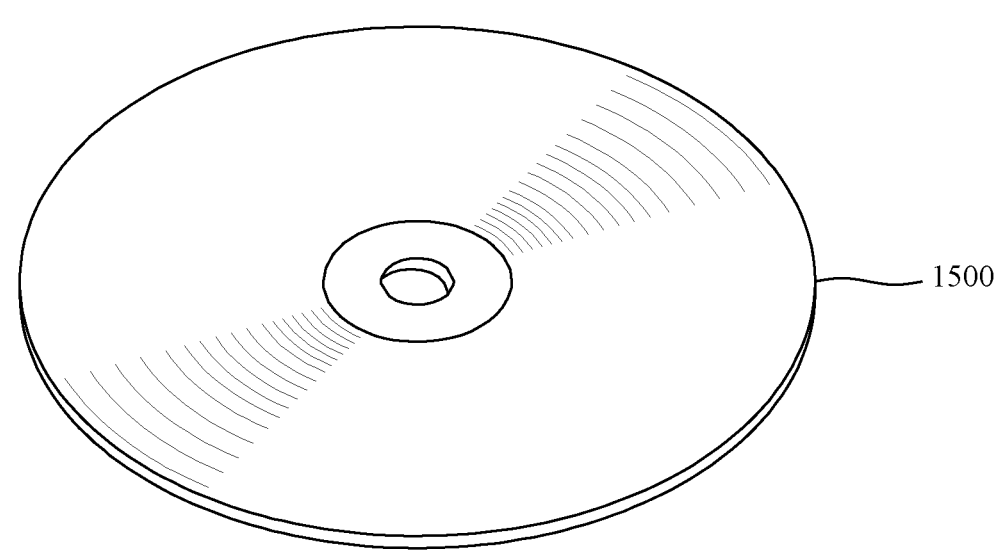
FIG. 15 illustrates an electronic storage medium on which computer program embodiments can be stored.

As also will be appreciated by one skilled in the art, the embodiments may take the form of an entirely hardware embodiment or an embodiment combining hardware and software aspects. Further, the embodiments, e.g., the configurations and other logic associated with the charging process to include embodiments described herein, such as, the methods associated with FIGS. 6, 7 and 13 may take the form of a computer program product stored on a computer-readable storage medium having computer-readable instructions embodied in the medium. For example, FIG. 15 depicts a computer readable storage medium 1500 on which computer program embodiments can be stored. Any suitable computer-readable storage medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for providing lawful interception, LI, in a radio communication system with network slices, the method comprising:

selecting one of the network slices able to provide a network service at a predetermined service level to a user equipment, the one of the network slices being also configured to execute an LI mediation and delivery function, MDF; and triggering a point of interception, POI, associated with or embedded in a network function, NF, implemented on the one of the network slices for delivering the network service to intercept LI data from the NF, and to forward the LI data to the LI MDF within the one of the network slices, if a party to the network service has been indicated as being an LI target, wherein the LI MDF reformats and transmits the LI data outside the one of the network slices.

2. The method of claim 1, further comprising:

if the one of the network slices is also used to provide a second network service to the party, using a second network function, NFA, implemented on the one of the network slices, then triggering a second point of interception, POIA, associated with or embedded in the NFA to intercept the LI data from the NFA and to forward the LI data intercepted from the NFA to the LI MDF within the one of the network slices.

3. The method of claim 1, further comprising:

if the one of the network slices delivers the network service using another network function, NFB, and another party involved in the network service delivered using the NFB has been indicated as being another LI target, then triggering another point of interception, POIB, associated with or embedded in the NFB to intercept the LI data from the NFB and to forward the LI data intercepted from NFB to the LI MDF within the one of the network slices.

4. The method of claim 1, wherein the POI encrypts the LI data forwarded to the LI MDF and/or the LI MDF encrypts the LI data transmitted outside the one of the network slices.

5. The method of claim 1, wherein the one of the network slices being configured to execute the LI MDF is determined based on a value of an LI MDF support attribute of a network slice type corresponding to the one of the network slices.

6. The method of claim 5, wherein the LI MDF support attribute is a binary parameter.

7. The method of claim 5, wherein the network slice type includes a value of at least one other LI-related attribute besides the LI MDF support attribute.

8. The method of claim 1, further comprising:

triggering a point of interception, AMF-POI, associated with or embedded in an access and mobility management function, AMF, of the network system, to intercept AMF LI data and to transmit the AMF LI data to the LI MDF that reformats and transmits the AMF LI data outside the one of the network slices.

9. The method of claim 1, wherein the network system is a 5G system.

10. The method of claim 1, wherein the POI is associated with at least one other network function implemented on the one of the network slices.

11. The method of claim 1, wherein the selecting of the one of the network slices includes if none of existing network slices is able to provide the network service and hosts the LI MDF, triggering deployment of the network slice to be selected.

12. A method of providing lawful interception, LI, capability in a radio communication system, the method comprising:

providing at least two network slices configured to enable delivery of network services, each of the at least two network slices being also configured to execute a lawful interception, LI, mediation and delivery function, MDF; and on each of the at least two the network slices, connecting one or more points of interceptions, POIs, associated with or embedded in one or more network functions, NFs, implemented therein, to the LI MDF, wherein the one or more POIs are configured to intercept LI data from at least one of the one or more NFs, respectively, and to forward the LI data to the LI MDF inside a respective one of the at least two network slices, and the LI MDF is configured to reformat and transmit the LI data outside the respective one of the at least two network slices.

13. The method of claim 12, further comprising:

connecting a POI associated with an access and mobility management function, AMF, of the network system, to the LI MDF on each of the at least two network slices.

14. The method of claim 12, wherein the at least two network slices are configured to deliver the network services at different predetermined service levels.

15. The method of claim 12, wherein the at least two network slices are configured to deliver different types of network services thereby causing different types of traffic.

16. A network device in a radio communication system with network slices, the network device having a network interface and a data processing unit adapted to:

select one of the network slices able to provide a network service to a user equipment at a predetermined service level, the one of the network slices being also configured to execute a lawful interception, LI, mediation and delivery function, MDF, and trigger a point of interception, POI, to intercept LI data from an NF implemented on the network slice for delivering the network service and to forward the LI data to the LI MDF within the one of the network slices, if an indication that a party to the network service is an LI target has been received.

17. A network device in a radio communication system with network slices, the network device having a network interface and a data processing unit adapted to:

obtain a set of requirements for a network service causing a traffic that is legally intercepted if a party is an LI target;

convert the network requirements into network slice attributes with associated values to form a LI network slice type; and if a network slice having the LI network slice type is available, provide the network service using the available network slice, otherwise trigger deployment of a network slice instance having the LI network slice type.

\* \* \* \* \*